(12) United States Patent
Rattray

(10) Patent No.: US 11,709,659 B1
(45) Date of Patent: Jul. 25, 2023

(54) SYSTEMS AND METHODS FOR A CODE GENERATION TOOL FOR SOFTWARE DEVELOPMENT SYSTEMS

(71) Applicant: Stripe, Inc., San Francisco, CA (US)

(72) Inventor: William Alexander Rattray, Oakland, CA (US)

(73) Assignee: Stripe, Inc., San Francisco, CA (US)

( * ) Notice: Subject to any disclaimer, the term of this patent is extended or adjusted under 35 U.S.C. 154(b) by 287 days.

(21) Appl. No.: 17/211,463

(22) Filed: Mar. 24, 2021

Related U.S. Application Data (60) Provisional application No. 62/994,493, filed on Mar. 25, 2020.

(51) Int. Cl.
| | |
|---|---|
| *G06F 9/44* | (2018.01) |
| *G06F 8/30* | (2018.01) |
| *G06F 8/10* | (2018.01) |
| *G06F 8/41* | (2018.01) |

(52) U.S. Cl.
CPC .................. *G06F 8/31* (2013.01); *G06F 8/10* (2013.01); *G06F 8/42* (2013.01)

(58) Field of Classification Search
None
See application file for complete search history.

(56) References Cited

U.S. PATENT DOCUMENTS

| | | | | |
|---|---|---|---|---|
| 7,992,139 B2 * | 8/2011 | Chitgupakar | ............. | G06F 8/51 717/136 |
| 10,747,507 B2 * | 8/2020 | Maruno | .................... | G06F 8/33 |
| 2007/0157288 A1 * | 7/2007 | Lim | ..................... | G06F 11/3438 726/1 |
| 2012/0204161 A1 * | 8/2012 | Ben-Artzi | ................. | G06F 8/76 717/137 |
| 2013/0263099 A1 * | 10/2013 | Box | .......................... | G06F 8/42 717/146 |
| 2016/0246622 A1 * | 8/2016 | Simonyan | ............ | G06F 9/45529 |
| 2016/0299748 A1 * | 10/2016 | Scholz | .................... | G06F 8/427 |

* cited by examiner

*Primary Examiner* — Qamrun Nahar
(74) *Attorney, Agent, or Firm* — Womble Bond Dickinson (US) LLP (57) ABSTRACT

Systems and methods for code generation are described. The method may include accessing an application programming interface (API) specification written in a first computer programming language. The method may also include processing the API specification in the first computer programming language with a code generation tool. Furthermore, the method may include generating, from the API specification, code in each of a plurality of different computer programming languages different from the first computer programming language and different from each other.

21 Claims, 5 Drawing Sheets

SYSTEMS AND METHODS FOR A CODE GENERATION TOOL FOR SOFTWARE DEVELOPMENT SYSTEMS

PRIORITY

This application claims priority to, and is a non-provisional application of, U.S. Provisional Patent Application No. 62/994,493, filed on Mar. 25, 2020, which is hereby incorporated by reference in its entirety.

BACKGROUND

An application programming interface (API) is a set of functions, libraries, operations, etc. that enable software to be developed for accessing other systems. Transaction based systems operating on server computer system(s) may provide an API for interacting with the system on the server(s) provided by that system, for example using messaging defined by the API. For example, a financial processing system, such as that provided by STRIPE™, may enable systems to interact with servers of the financial processing system to initiate financial transactions, provide data to the servers to be used for transactions, receive redirections, receive messages from the financial processing system (e.g., transaction confirmation, transaction rejection, payout, etc. messages), as well as many other services, functions, and operations provided by the financial processing system.

Modern software deployment may use any of a range of different programming languages and environments, such as PHP, Python, Ruby, Node, Java, .Net, Go, and other software development languages, tools, and systems. Thus, code is generated to implement and document multiple supported client API libraries, such as libraries provides for PHP, Python, Ruby, Node, Java, .Net, Go, etc. Making a change to the API of the financial processing system, for example to support the addition of a new function, change in formatting of a message exchange, update a protocol, etc., requires unique and different changes to each of the individual API libraries to obtain the corresponding functionality. This process is technically challenging, time consuming, and error prone.

Traditionally, there have been two primary methods for generating code: string interpolation, and Abstract Syntax Tree (AST) building with AST-based printers. Both have drawbacks. String interpolation gets messy, and leaves details up to the implementer, resulting in time consuming efforts to correct and/or edit trailing punctuation and whitespace in generated code in order to generate compilable or near-compilable code. AST building, while less likely to produce non-compiling code, is also time consuming, can be verbose, and removes formatting control, frequently producing code with unappealing and/or non-existent formatting. Furthermore, not all programming languages have tools to build an AST and print the result to code, and each is typically implemented in its own language.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Described herein is a system and method for a code generation tool that generates readable code in several languages. In embodiments, the tool may be a declarative language tool, such as a REACT like tool. Furthermore, the tool may be based on, and use, a code formatter, such as for example PRETTIER or other language agnostic formatting tools. As discussed herein, the tool may be deployed by a commerce platform system, such as the commerce platform systems 110 and/or 210 discussed below in FIGS. 1 and 2, to generate code for an API and/or API documentation provided by the commerce platform system for each API library (e.g., PHP, Python, Roby, Node, Java, .Net, Go, etc. client API libraries) supported by the commerce platform system. Thus, in embodiments, when a change is made to the API of the commerce platform system, the tool discussed herein will generate accurate and readable code, code snippets for documentation, etc. in each of the different languages.

Furthermore, in embodiments, a declarative API specification of the commerce platform system's API, such as an OpenAPI specification, may be used to automatically generate the updates. Declarative API specifications, such as OpenAPI specifications, are for machine-readable interfaces that describe, produce, and otherwise operate with web services (e.g., services in networked environments).

In embodiments, the code generation tool is a general purpose code generation tool that is not bound to the functions of the commerce platform system, and instead operates on the underlying functions of the software upon which the APIs are built. That is, the code generation tool may be deployed for code generation in various environments, and is not limited to the commerce platform system environment discussed herein. However, the code generation tool will be discussed in the context of a commerce platform system to provide examples and exemplary implementation embodiments for the code generation tool.

Therefore, the code generation tool may be used with the declarative API specification to generate code, documentation, etc. in each of the languages to solve the technical problems associated with making a change in an API that should be then carried out in a number of API libraries of different languages, each having their own unique requirements.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "ingesting", "defining", "performing", "generating", "receiving", "processing", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

Figure 1:
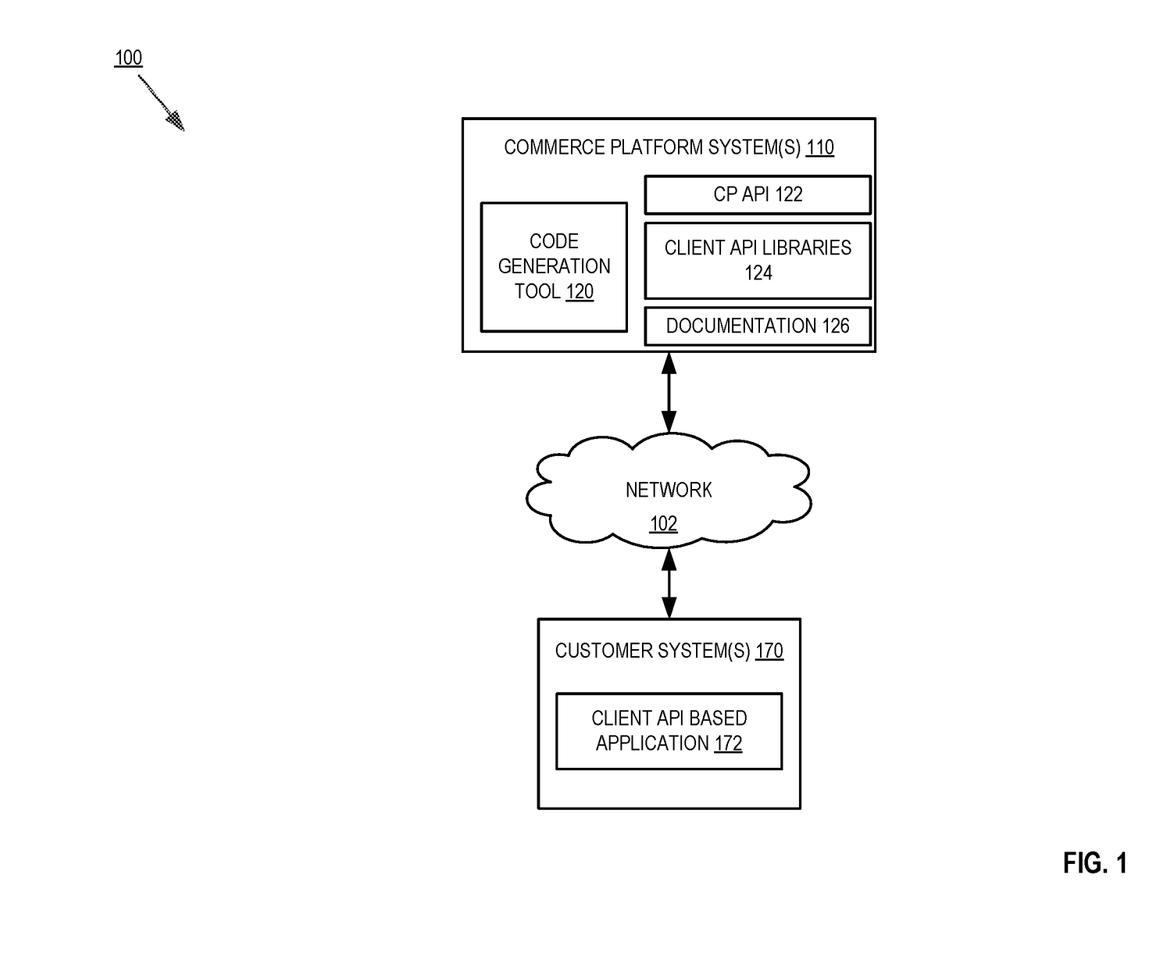
FIG. 1 is a block diagram of an exemplary system architecture for executing a code generation tool for automatically generating client API libraries and documentation in multiple languages.

FIG. 1 is a block diagram of an exemplary system architecture 100 for executing a code generation tool for automatically generating client API libraries and documentation in multiple languages. In embodiments, the system 100 includes commerce platform system(s) 110 and customer system(s) 170. In embodiments, commerce platform system(s) 110 and customer system(s) 170 are computing devices, such as server computers, desktop computers, mobile devices, etc. that include typical computing hardware (e.g., one or more processors, memory, a communications bus, a network interface, etc.), as illustrated and discussed with respect to FIG. 5 below.

The commerce platform system(s) 110 and customer system(s) 170 may be coupled to a network 102 and communicate with one another using any of the standard protocols for the exchange of information. However, due to the sensitive nature of the information being exchanged during financial transactions, payment clearance, etc., in embodiments, the commerce platform system(s) 110 and customer system(s) 170 may communicate with each other as discussed herein using protocols for the secure exchange of information, such as using Transport Layer Security (TLS), Secure Sockets Layer (SSL), Secure Shell (SSH), or other protocols for the secure exchange of information. In embodiments, one or more of the commerce platform system(s) 110 and customer system(s) 170 may run on one Local Area Network (LAN) and may be incorporated into the same physical or logical system, or different physical or logical systems. Alternatively, one or more of the commerce platform system(s) 110 and customer system(s) 170 may reside on different LANs, wide area networks, cellular telephone networks, etc. that may be coupled together via the Internet but separated by firewalls, routers, and/or other network devices. It should be noted that various other network configurations can be used including, for example, hosted configurations, distributed configurations, centralized configurations, etc.

In embodiments, commerce platform system(s) 110 provide services to customer systems(s) 170 in the form of software services. That is, customer system(s) 170 may execute software systems, such as client API based application 172, using a client API library 124 provided by the commerce platform system(s) 110, in order to interact with the software, systems, and services of the commerce platform system(s) 110. For example, in one embodiment, commerce platform system(s) 110 are online payments systems that provides a range of services via one or more application programming interfaces (APIs), such as through web based interfaces, messaging exchanges via API endpoints, webhooks, etc. for providing payment services for internet based commerce, including but not limited to, payment services for subscription services, on-demand marketplaces, e-commerce stores, crowdfunding platforms, sharing economy applications, etc. In one embodiment, the commerce platform system(s) 110 provide products and services by the STRIPE™ commerce platform.

Furthermore, handling payments may also refer to, for example, the commerce platform system(s) 110 providing various payment services including clearing payments, executing charges, performing fraud checks, reconciling payments, executing refunds, vaulting card information for customers, managing agents of a customer, providing accounting and/or real-time payment analysis to customer system(s) 170, providing user interfaces via web pages, native applications, mobile applications, etc. That is, commerce platform systems(s) 110 provide a comprehensive set of tools, applications, interfaces, etc., referred to herein as products and/or services of the commerce platform system(s) 110, enabling the processing and management of payments for customer system(s) 170, and well as enabling other services for customer system(s) 170.

In embodiments, commerce platform system(s) 110 provide their services to customer system(s) 170 through one or more API(s), such as CP API 122. A customer system, therefore utilizes one of the client API libraries 124, when generating a client API based application 172 (e.g., a server application, a mobile application used by agents of the customer system, a web page based application, as well as other types of API-based applications). The client API based application 172, developed using a client API library 124, will enable the customer system 170 to interact with the CP API 122 to perform transactions, exchange messages, manage accounts, etc. and otherwise access the services of the commerce platform system 110. Furthermore, the documentation 126 is provided by commerce platform system(s) 110 to customer system(s) 170, including code snippets, definitions, protocol descriptions, etc., describing how to properly code and deploy applications using the functions, methods, protocols, etc. in the client API libraries 124.

Typically, a first customer system 170 may choose to use client API library 124 for a first programming language (e.g., Ruby) due to how the customer system 170 and/or its applications are implemented. A second customer system (not shown in FIG. 1) may choose to use a different API library 124 for a different programming language (e.g., Python). Thus, to support each of these libraries and the different client implementations of the client API libraries with supporting documentation, commerce platform system 110 uses code generation tool to generate code and/or documentation automatically from the CP API 122, as discussed in greater detail below.

Figure 2:
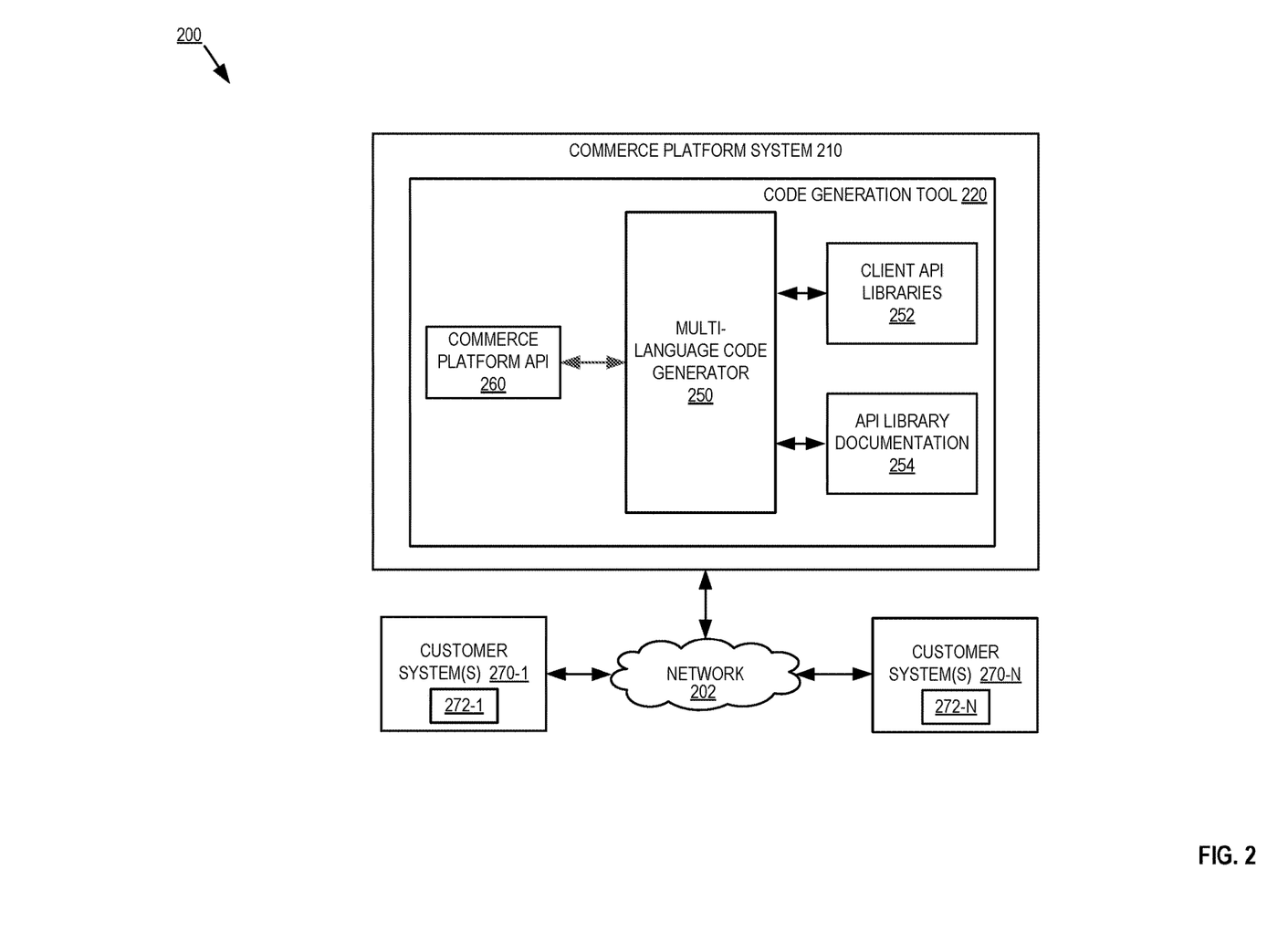
FIG. 2 is a block diagram of one embodiment of a code generation tool of a commerce platform system, and a plurality of customer systems.

FIG. 2 is a block diagram of one embodiment 200 of a code generation tool 220 of a commerce platform system 210, and a plurality of customer systems 270-1 and 270-N. The commerce platform system 210 and customer system(s) 270-1 through 270-N provide additional details for those discussed above in FIG. 1.

In embodiments, code generation tool 220 automatically generates code and documentation (e.g., client API libraries 252 and API library documentation 254) in several different languages for use by customer system(s) 270-1 through 270-N. The different libraries and documentation enable deployment on various platforms of different customer systems, such as customer systems 270-1 through 270-N. Furthermore, code generation tool 220 solves technical problems associated with carrying changes from an API and/or specification forward to different language, their specific requirements, and generating supporting documentation.

Figure 5:
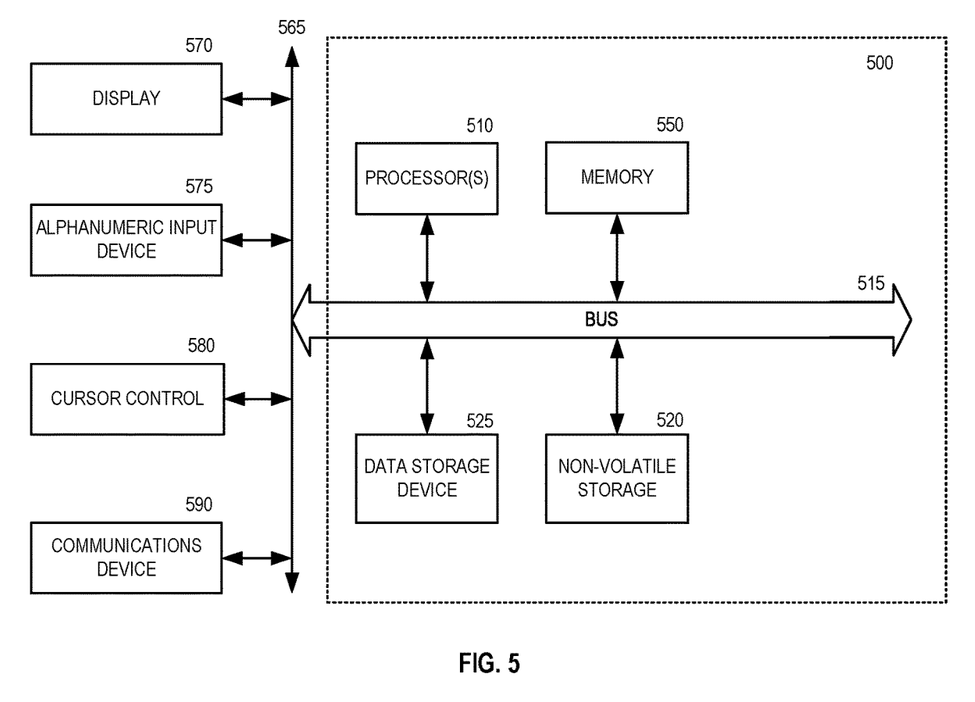
FIG. 5 is one embodiment of a computer system that may be used to support the systems and operations discussed herein.

In one embodiment, commerce platform 210 may include the code generation tool 220. It should be appreciated that embodiments of the invention as described herein may be implemented through the execution of instructions, for example as stored in a memory, and executed by processor(s), and/or other circuitry. Particularly, code generation tool 220 may operate under the control of a program, routine, or the execution of instructions to execute methods or processes in accordance with embodiments of the invention to perform the operations described herein. For example, such a program may be implemented in firmware or software (e.g. stored in a memory) and may be implemented by processors and/or other circuitry. Further, it should be appreciated that the terms processor, microprocessor, circuitry, controller, etc., may refer to any type of logic or circuitry capable of executing logic, commands, instructions, software, firmware, functionality and the like. FIG. 5 illustrates an embodiment of a system that may be used to implement code generation tool 220.

Multi-language code generator 250 is a general purpose code generation tool that comprises various code libraries. The libraries can include a code generation library built upon the PRETTY code formatting library, where the code generation library is built to generate code for several target libraries 252 from an original code, as well as in embodiments the documentation 254 for the code of the corresponding different libraries. The original code may be the commerce platform API 260. Thus, in embodiments, code changes may be made to the commerce platform API 260 in a language of the API, for example to support new functions, services, protocols, message formats, etc., and updates automatically generated for client API libraries 252 and documentation 254 (e.g., the client code implementing and documenting the API) by the multi-language code generator 250 for the corresponding language of the different client API implementations. Rather than writing changes to each library, multi-language code generator 250 may update the API client libraries and documentation via a single command executed by the multi-language code generator 250.

In embodiments, multi-language code generator 250 is a "learn once, write everywhere" tool, so that while each language's implementation by the tool is slightly different, just as each underlying language's design/implementation is different, they translate very easily from the constructs to the new language.

To help explain how multi-language code generator 250 works, a few "hello world" examples are provided below for several languages. The languages used in the examples are not limiting, as any number of different languages, functions, protocols, commenting, etc. can be supported using the illustrated and described techniques. That is, these are example, and they can be adapted to various functions, constructs, flows, etc. in various languages. In the examples, the FLOW programming language is used. Each of these examples uses the multi-language code generator 250 to produce code that will output "Hello, world!", which is executable in the relevant target language.

That is, if "Hello, world!" is a function defined in the declarative language of the commerce platform API 160 (e.g., an API based function that the commerce platform enables various systems to utilize via different API code libraries), then when multi-language code generator 250 encounters the function defined in the code of the commerce platform API code library, the multi-language code generator 250 can generate corresponding code of different programming languages, as well as documentation, which is executable or near executable and suitable for inclusion in client API libraries 252 and/or API library documentation 254. Thus, if a change to the "Hello, world!" function is made to the code of the commerce platform API 260, multi-language code generator 250 may be executed to access and transform the commerce platform API 260 from commerce platform's declarative statement version of code to outputs for the updated function and/or documentation in the various languages supported by the multi-language code generator 250. Beneficially, each different programming language of the client API libraries 252 and documentation 254 need not be individually updated, as the multi-language code generator 250 automatically generates the updated code and/or documentation.

The examples that illustrate and explain how multi-language code generator 250 could be configured to generate code for several different programming languages and/or documentation for a function, such as the "hello world" function, are provided below.

Say Hello, Ruby

First is an example of code for the multi-language code generator 250 to generate a Ruby script:

/ @flow
/ The variable is called "React" for JSX tooling

```
import {React, renderToString, Ruby} from '@internal/
  prettier_poet
/* Hello, Ruby! */
const SayHelloRuby=({message})=> (
  <Ruby.MethodCall callee="puts" parens={false} args={
    [message]}/>
);
const sayHello=(message)=>
  console.log(
    renderToString(<SayHelloRuby message={message}/
      >, {printWidth: 80}
  );
sayHello('Hello, world!');
```

When the code generated by multi-language code generator 250 is run, the following is generated:
```
Puts Hello, world!
```

This is nearly Ruby code, but it is not yet a string, which it should be. This can be updated by putting the "message" inside a "<ruby.String />":
```
const SayHelloRuby=({message})=> (
  <Ruby.MethodCall
    callee="puts"
    parens={false}
    args={[<Ruby.String value={message}/>]}
  />
);
```

Now, sayHello('Hello, world!') outputs:
```
puts 'Hello, world!'
```

That is correct. However, if "message" is to be the number 42, <Ruby.String> (which will hold a string) can be swapped with <Ruby.Literal>, which can hold and render a range of types. The updated code for the generator would then be:
```
const SayHelloRuby=({message})=> (
  <Ruby.MethodCall
    callee="puts"
    parens={false}
    args={[<Ruby.Literal value={message}/>]}
  />
);
```

Now, while still working from the string example above, sayHello(42) gives the following:
```
puts 42
```

Say Hello, Javascript

A Javascript Component may also be added to the code for multi-language code generator 250. To do this, JS is added to "import{ }" in the code of generator 250, and the sayHello ( ) construct can be updated to work with multiple languages. <JS.MethodCall> and <JS.Literal> are available. Then, an embodiment of the code would be:
```
/ JS added here
import {React, renderToString, Ruby, JS} from '@internal/
  prettier_poet
/* Hello, Ruby! */
const SayHelloRuby=({message})=> (
  <Ruby.MethodCall
    callee="puts"
    parens={false}
    args={[<Ruby.Literal value={message}/>]}
  />
);
/* Hello, Javascript! */
  const SayHelloJavascript=({message})=> (
    <JS.MethodCall callee="console.log" args={[<JS.Literal
      value={message
    );
const sayHello=(lang, message)=>{
  const HelloSayer={
    ruby: SayHelloRuby,
    javascript: SayHelloJavascript,
  }[ang];
  console.log(
    renderToString(<HelloSayer message={message}/>,
      {printWidth: 80}),
  );
};
```

Using sayHello('javascript', 'Hello, world!'), the following code is generated:
```
console.log('Hello, world!')
```

However, the semicolon is missing, and to get a real Javascript statement, <JS.Statements> can be used:
```
const SayHelloJavascript=({message})=> (
  <JS.Statements>
    <JS.MethodCall
      callee="console.log"
      args={[<JS.Literal value={message}/>]}
    />
  </JS.Statements>
);
```

Execution of the code would now give:
```
console.log('Hello, world!');
```

The output could further be commented by:
```
const SayHelloJavascript=({message})=> (
  <JS.Statements>
    <JS.Comment>
      This will output <JS.Literal value={message}/> to the
        console!
    </JS.Comment>
    <JS.MethodCall
      callee="console.log"
      args={[<JS.Literal value={message}/>]}
    />
  </JS.Statements>
);
```

This would cause multi-language code generator 250 to output:
```
/ 'Hello, world!'
/ to the console!
console.log('Hello, world!');
```

To have a block comment instead, the code could be updated to:
```
const SayHelloJavascript=({message})=> (
  <JS.Statements>
    <JS.Comment block>
      This will output <JS.Literal value={message}/> to the
        console!
    </JS.Comment>
    <JS.MethodCall
      callee="console.log"
      args={[<JS.Literal value={message}/>]}
    />
  </JS.Statements>
);
```

With that change, generator 250 would output:
```
/**
 * This will output
 * 'Hello, world!'
 * to the console!
 */
console.log('Hello, world!');
```

Hello World, PHP

Additional languages, such as PHP can be supported by code generator 250 by adding a PHP import in the code generator's 250 code and adding the PHP implementation for sayHello( ). Furthermore, as illustrated above, if a trailing semicolon is wanted in PHP, everything is wrapped in a <PHP.Statements> block. An example implementation embodiment is shown below:

```
import {
  React,
  renderToString,
  Ruby,
  JS,
  PHP, / added in this illustrative embodiment
} from '@stripe-internal/prettier-poet';
const SayHelloRuby=({message})=> (
  <Ruby.MethodCall
    callee="puts"
    parens={false}
    args={[<Ruby.Literal value={message}/>]}
  />
);
const SayHelloJavascript=({message})=> (
  <JS.Statements>
    <JS.MethodCall
      callee="console.log"
      args={[<JS.Literal value={message}/>]}
    />
  </JS.Statements>
);
/* Hello, PHP! */
const SayHelloPhp=({message})=> (
  <PHP.Statements>
    <PHP.MethodCall callee="echo" args={[<PHP.Literal value={message}/
  </PHP.Statements>
);
const sayHello=(lang, message)=>{
  const HelloSayer={
  ruby: SayHelloRuby,
  javascript: SayHelloJavascript,
  php: SayHelloPhp,
}[lang];
  console.log(
    renderToString(<HelloSayer message={message}/>,
    {printWidth: 80}),
  );
};
```

When run by generator 250, sayHello ('php', 'Hello, world!') produces:
Echo('Hello, world!')

The above is valid PHP, but echo is expected without parentheses because it's a built-in language construct rather than a function. Thus, <ConstructCall> can be used instead:

```
const SayHelloPhp=({message})=> (
  <PHP.Statements>
    <PHP.ConstructCall
      construct="echo"
      args={[<PHP.Literal value={message}/>]}
    />
  </PHP.Statements>
);
```

When code generator 250 executes sayHello( ) again for PHP, the following is produced:
echo 'Hello, world!';

Although this looks correct, it is missing the PHP_EOL, which can be added by:

```
const SayHelloPhp = ({message}) => (
  <PHP.Statements>
```

```
    <PHP.ConstructCall
      construct="echo"
      args={[
        <>
          <PHP.Literal value={message} /> . PHP_EOL
        </>,
      ]}
    />
  </PHP.Statements>
);
```

The "< >" component, which is similar to a <React.Fragment>, and provides a container in which rendering of the literal "message," the line ending, and the concatenation dot. It can also be used in places where a hard coded string is needed, such as to replace callee="echo" with callee={< >echo</>}, and would work the same. Now when code generator 250 runs sayHello( ) for PHP, the following would be generated:
echo 'Hello, world!'. PHP_EOL;

Then, if the message were desired to be put in a variable first:

```
const SayHelloPhp = ({message}) => (
  <PHP.Statements gap={2}>
    <PHP.Assignment name="message"
      value={<PHP.Literal value={message}
    <PHP.ConstructCall
      construct="echo"
      args={[
        <>
          <PHP Variable value="message" /> . PHP_EOL
        </>
      ]}
    />
  </PHP.Statements>
);
```

In the above, a <PHP.Assignment> of the message to the $message variable was done, and then code generator 250 uses the <PHP.Variable>, rather than the original message, in the <PHP.ConstructCall> construct. When sayHello( ) is run now, the following is generated:
$message='Hello, world!';
echo $message. PHP_EOL;
Say Hello, Java In this embodiment of an implementation, the Lines component is used, and so it is added with Java to the import { } section:

```
import {
  React,
  renderToString,
  Ruby,
  JS,
  PHP,
  Lines, //Added in this example
  Java, //Also added
} from '@stripe-internal/prettier-poet';
const SayHelloRuby = ({message}) => (
  <Ruby.MethodCall
    callee="puts"
    parens={false}
    args={[<Ruby.Literal value={message} />]}
  />
);
const SayHelloJavascript = ({message}) => (
  <JS.Statements>
    <JS.MethodCall
```

```
          callee="console.log"
          args={[<JS.Literal value={message} />]}
        />
    </JS.Statements>
);
const SayHelloPhp = ({message}) => (
    <PHP.Statements>
        <PHP.MethodCall callee="echo" args={[<PHP.Literal value={message} /
    </PHP.Statements>
);

/* Hello, Java! */
const SayHelloJava = ({message}) => (
    <Java.Class name="Main">
        <Java.MethodDefinition
            modifiers={['public', 'static']}
            returnType="void"
            name="main"
            params={[<Java.Declaration name="args" typeName="String[ ]" />]}
        >
            <Java.Statements>
                <Java.MethodCall
                    callee="System. out. printin"
                    args={[<Java.Literal value={message} />]}
                />
            </Java.Statements>
        </Java.MethodDefinition>
    </Java.Class>
);
const sayHello = (lang, message) => {
    const HelloSayer = {
        ruby: SayHelloRuby,
        javascript: SayHelloJavascript,
        php: SayHelloPhp,
        java: SayHelloJava,
    }[lang];
    console.log(
        renderToString(<HelloSayer message={message} />, {printwidth: 80}),
    );
};
```

Code generator 250 running sayHello('java', 'Hello, world!') generates output:

```
class Main {
    public static void main(String[ ] args) {
        System.out.printIn("Hello, world!");
    }
}
```

To change the formatting, a MessageSayer class can be created which can provide a "message" on instantiation, and which has a say( ) method that produces the output. To do this, <Lines> is used to build the Java MessageSayer:

```
const MessageSayer = ( ) => (
    <Java.Class name="MessageSayer">
        <Lines gap={2}>
            <Java.Statements>
                <Java.Declaration
                    modifiers={['private']}
                    name="message"
                    typeName="String"
                />
            </Java.Statements>
            <Java.MethodDefinition
                name="MessageSayer"
                params={[<Java.Declaration name="message"
                    typeName="String" />]}
            >
                <Java.Statements>
                    <Java.Assignment name="this.message">
                        <>message</>
                    </Java.Assignment>
                </Java.Statements>
```

```
            </Java.MethodDefinition>
            <Java.MethodDefinition
                modifiers={['public']}
                returnType="void"
                name="say"
                params={[ ]}
            >
                <Java.Statements>
                    <Java.MethodCall
                        callee="System.out. printin"
                        args={[['this.message']]}
                    />
                </Java.Statements>
            </Java.MethodDefinition>
        </Lines>
    </Java.Class>
);
```

The <SayHelloJava> component can be refactored and it's "Main" class to make use of the new <MessageSayer>:

```
const SayHelloJava = ({message}) => (
    <Java.Statements gap={2}>
        <MessageSayer/>
        <Java.Class name="Main">
            <Java.MethodDefinition
                modifiers={['public', 'static']}
                returnType="void"
                name="main"
                params={[<Java. Declaration name="args"
                    typeName="String[ ]" />]}
            >
                <Java.Statements gap={2}>
                    <Java.Declaration name="sayer" typeName="MessageSayer">
                        <Java.ObjectCreation
                            typeName="MessageSayer"
                            params={[<Java.Literal value={message} />]}
                        />
                    </Java.Declaration>
                    <Java.MethodCall callee="sayer.say" />
                </Java.Statements>
            </Java.MethodDefinition>
        </Java.Class>
    </Java.Statements>
);
```

Running sayHello( ) by code generator 250 now outputs:

```
class MessageSayer {
    private String message;
    MessageSayer(String message) {
        this.message=message;
    }
    public void say( ) {
        System.out.printIn(this.message);
    }
};
class Main {
    public static void main(String[ ] args) {
        MessageSayer sayer=new MessageSayer("Hello, world!");
        sayer.say( );
    }
};
```

The examples above, for SayHello( ) that can generate code output in Ruby, Java, JavaScript, and PHP, are examples of how the declarative language, which could be used to encode the commerce platform API 260 would generate API libraries 252 (e.g. code in the language of the API library from the commerce platform's API code). Furthermore, such code could also be used in generating documentation, snippets for documentation, etc. by embedding the relevant documentation, snippets, code fragments, etc. in a relevant output function. This code and documentation could then be distributed and used by customer system(s) 270 in their applications 272.

In embodiments, the generated code may or may not be compilable. In embodiments, when not compilable, the code is output for further modification. However, the outputted code provides near compilable code that reduces engineering time to bring code into a compilable format, such as by generating notifications for developers including the near compilable code (e.g. near compilable snippets) and receiving updates to the code including a compilable form of the previously non-compilable code. Furthermore, the generated code may be more easily used when generating documentation 254, such as by outputting code and/or snippets to relevant predefined locations within a documentation library for a corresponding client API.

In embodiments, the functions coded into generator 250 for outputting code in multiple languages may correspond to nodes in an abstract syntax tree, and may be updated as nodes/code appears. That is, when there is a need, code and the language specific outputs may be generated for that needed function, features, formatting, etc. as illustrated above. For example, code may be implemented and then added to code generator 250 for an AST node in a target language. Thereafter, the added can be used to generate code for each language, as well as documentation.

Furthermore, in embodiments, new language constructs can be added. As indicated above, in embodiments, the multi-language code generator 250 is written in the FLOW programming language. In the examples above, the "echo" built-in language construct, and not just a regular function, was encountered. While it can be written with a single argument in parentheses ("echo($foo))", it is usually written without them.

While a "<PHP.MethodCall> was also shown above, it enclosed arguments in parentheses as expected in PHP. To make this work, a new component was added: php.jsx. Flow's "type"s are used to ensure the expected arguments are obtained, and the component is:

```
type ConstructCallProps={|
  callee: Doc,
  args?: Array<Doc>,
|};
PHP.ConstructCall=({callee, args=[ ]}: ConstructCall Props)=>{
  return (
    <Group>
      {callee}
      {args.length && ' '}
      <CommaSeparated trailing={false} spaces indent>
        {args}
      </CommaSeparated>
    </Group>
  );
};
```

In the above, the <Group> includes a "callee", optionally a space, if there are args, and a <CommaSeperated> list of "args".

Furthermore, tests may be added to code generator 250 to ensure that the output wanted is the output obtained:

```
it('no args', ( )=>{
  snapDoc(<PHP.ConstructCall construct="foo"/>);
});
it('no args in a statement', ( )=>{
  snapDoc(
    <PHP.Statements>
      <PHP.ConstructCall construct="foo"/>
    </PHP.Statements>,
  );
});
it('long list of args', ( )=>{
  const args=[longString('a'), longString('b'), longString('c')];
  snapDoc(<PHP.ConstructCall construct="foo" args={args}/>);
});
it('some args in a statement', ( )=>{
  const args=[longString('a'), longString('b'), longString('c')];
  snapDoc(
    <PHP.Statements>
      <PHP.ConstructCall construct="foo" args={args}/>
    </PHP.Statements>,
  );
});
it('single long array/hash arg', ( )=>{
  const hash={a: longString('a', 30), b: longString('b', 30)};
  snapDoc(
    <PHP.ConstructCall construct="foo" args={[<PHP.Literal value={hash}
  );
  const arr=[longString('a'), longString('b', 50)];
  snapDoc(
    <PHP.ConstructCall construct="foo" args={[<PHP.Literal value={arr}
  );
});
```

An example listing of components, implemented using the techniques discussed above, include and are not limited to:

<CommaSeperated>
<Group>
<Hardcoded>
<Hardline>
<IfBreak>
<Indent>
<Separated>
<Softline>

In a tool for generating formatted code, such as PRETTIER, input text is parsed (e.g. by the Babel Parser) to produce an abstract syntax tree (AST) representation of the input text, which from the AST representation produces an intermediate representation (IR), which is used to print (e.g., using a "printer" of the PRETTIER tool) to generate a standardized formatted output of the input text. Instead of using the parser to produce the AST, in embodiments, React-like Components are configured within the code generator 250 to transform input into an AST, then into the intermediate representation, and printers transform the intermediate representation to produce the output. In embodiments, the coded functions that transform a commerce platform API construct to each of the client API equivalents may generate ASTs for relevant client API libraries when transforming an updated version of the commerce platform API to corresponding client APIs, which printers (e.g. Prettier Printers) transform into formatted code.

In the embodiments discussed herein, the commerce platform API 260, which may be code or an OpenAPI specification, client libraries 252 can be generated. For example, declarative statements like retrieve, create, delete, update, etc., standard versions, nested, single, etc. of the statements may be used in defining, documenting, and generating code for the commerce platform API 260. Furthermore, example code snippets for documentation 254 may also be generated, including API requests, API responses, etc. that satisfy the API 260 (e.g., code or spec), and output to a relevant location (e.g., a documentation library). The code generator 250, in embodiments, may be implemented in JSX syntax, FLOW, or other declarative languages. An AST or other representation may then be generated by code generator 250 from the declarative language version of the commerce platform API, and language agnostic "printers" (e.g., PRETTIER printers) may be used to transform the AST or intermediate representation to human readable, and formatted code, without having to use string interpolation for each of the relevant API languages given the configuration for the declarative language functions (e.g., using the technique of the example above). Such a technique will reduce burdensome engineering efforts, reduce technical problems that other code generators/translators have with style error creation and syntax errors, enable more snippets to be written more quickly in more languages, as well as other technical benefits.

Figure 3:
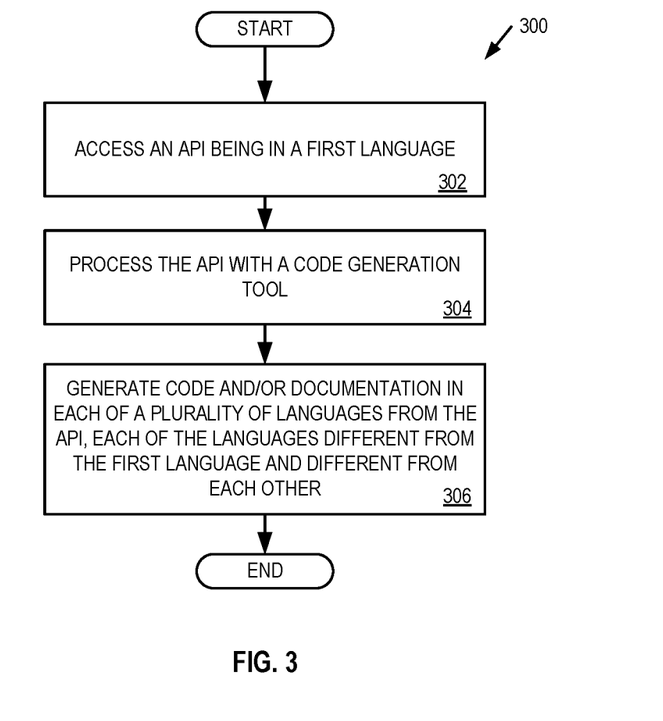
FIG. 3 is a block diagram of one embodiment of a process for code and/or documentation generation from an API.

FIG. 3 is a block diagram of one embodiment of a process 300 for code and/or documentation generation from an API. The process 300 is performed by processing logic that may comprise hardware (circuitry, dedicated logic, etc.), software (such as is run on a general-purpose computer system or a dedicated machine), firmware, or a combination thereof. In one embodiment, the process 300 is performed by a CSP analysis system 120 or 220.

Referring to FIG. 3, processing logic begins by accessing an API being in a first language (processing block 302). As discussed herein, the API may be an API of a commerce platform system, and may be written in a declarative language, such as a React-like language, such as JXN or Flow. Furthermore, the API may be an API specification, such as an OpenAPI specification, from which documentation and code may be generated. In an embodiment, the API may be an updated API (e.g. with new functions, flows, messages, etc.), and the accessing occurs in response to request of a developer to generate code and/or documentation from the API for a plurality of target languages, such as those supported in client APIs.

Processing logic processes the API with a code generation tool (processing block 304). As discussed herein, the code generation tool is a tool configured to take and transform the API (or API specification) from the first language into a plurality of different target languages, such as transforming code snippets, generating documentation, formatting functions, etc. For example, as discussed in greater detail above in FIG. 2, the input may be declarative regarding the function, component, construct, operation, etc. and the output is formatted expressive code snippets in various supported languages, such as code in JavaScript, Ruby, PHP, and Java for the statement SayHello( ). However, other functions, services, code, etc. may be input via a declarative statement, with corresponding outputs generated by the processing logic utilizing the techniques discussed in the example above. In embodiments, the inputted API may be transformed into one or more intermediate representations through the interpretation of the coded declarative expressions based on the configuration of a code generator (e.g., code generation 250).

Processing logic generates code and/or documentation in each of a plurality of languages from the API, where each of the languages is different from the first language and different from each other (processing block 306). In an embodiment, a document "printer" transforms the intermediate representation into code suitable for inclusion in relevant client library(s) and/or documentation, such as one or more code snippets formatted and/or commented per the configuration of code generator 250, and the output based on the declarative statements in the input API.

Figure 4:
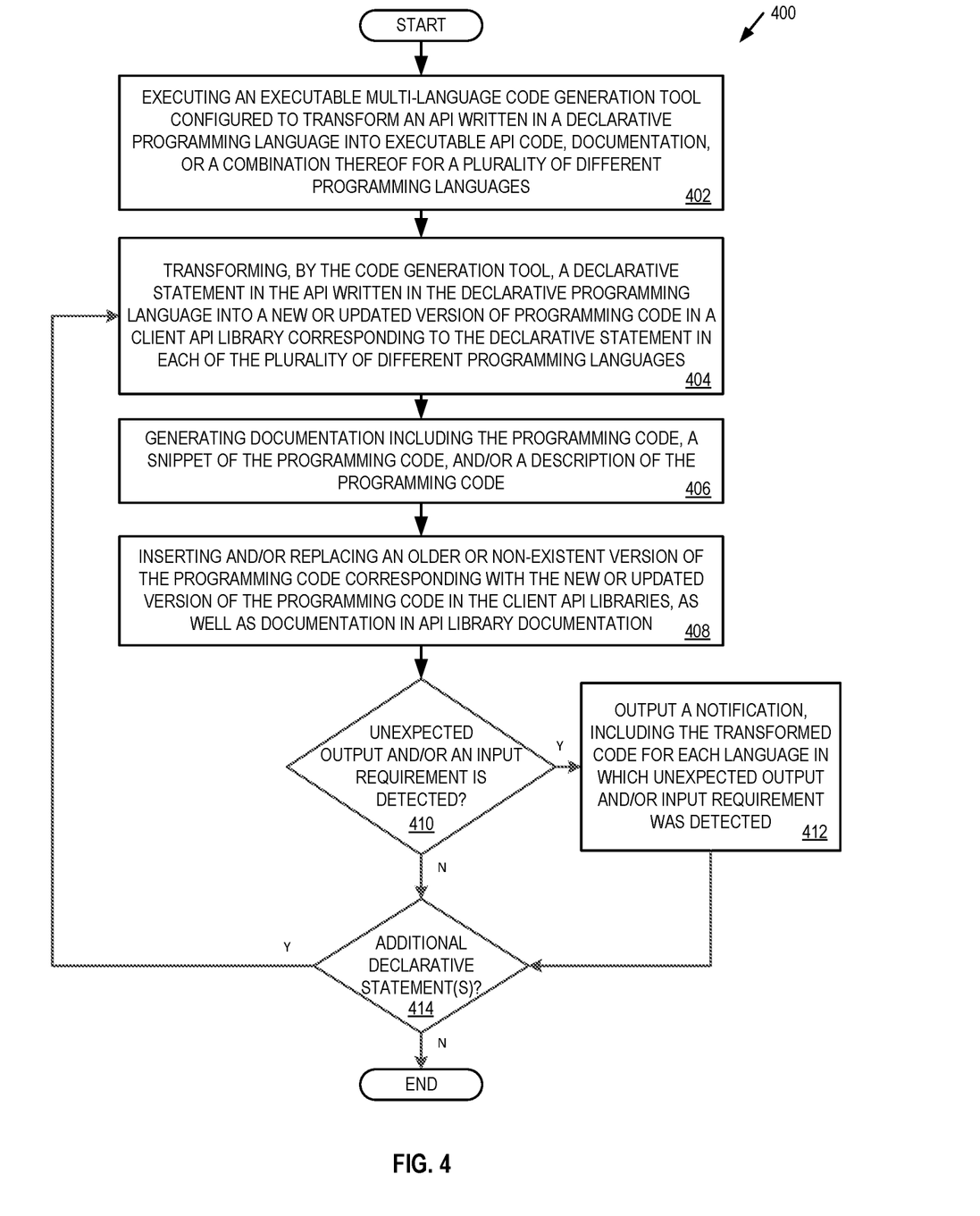
FIG. 4 is a block diagram of one embodiment of a process for generating code and/or documentation in a plurality of different programming languages from a declarative programming language.

FIG. 4 is a block diagram of one embodiment of a process 400 for generating code and/or documentation in a plurality of different programming languages from a declarative programming language. The process 400 is performed by processing logic that may comprise hardware (circuitry, dedicated logic, etc.), software (such as is run on a general-purpose computer system or a dedicated machine), firmware, or a combination thereof. In one embodiment, the process 400 is performed by a CSP analysis system 120 or 220.

Referring to FIG. 4, processing logic begins by executing an executable multi-language code generation tool configured to transform an API written in a declarative programming language into executable API code, documentation, or a combination thereof for a plurality of different programming languages (processing block 402). In one embodiment, the code generation tool is executed in response to a developer command, such as after one or more functions, statements, etc. of the declarative language API are updated and/or added. As discussed herein, the execution of the code generation tool enables a plurality of APIs in different languages to be updated based on the single update to the declarative language API.

Processing logic then transforms, by the code generation tool, a declarative statement in the API written in the declarative programming language into a new or updated version of programming code in a client API Library corresponding to the declarative statement in each of the plurality of different programming languages (processing block 404). As discussed herein, the code generation tool may generate an AST that that represents the structure of the source code (e.g. structure of the declarative programming language API code). Furthermore, the AST may then be transformed by accessing and using the various language specific versions of encoded functions to language specific functions.

Processing logic further, in embodiments, generates documentation including the programming code, a snippet of the programming code, and/or a description of the programming code (Processing block 406). In embodiments, the transformation process discussed above in processing block 404 may further output content specified or detected for documentation purposes. For example, the programming code, snippets of the programming code, and/or a description of the programming code for a given language may be output by processing logic to a relevant documentation library.

Processing logic then inserts and/or replaces an older or non-existent version of the programming code corresponding with the new or updated version of the programming code in the client API libraries, as well as documentation in API Library documentation (processing block 408). In embodiments, the update may be made by replacing relevant functions, statements, code, etc. within an existing API library.

Processing logic determines whether unexpected output and/or an input requirement is detected (processing block 410)? For example, code that is not formatted correctly for a given language, is not syntactically correct, etc. may be detected. Furthermore, code that is not compilable may also be detected. For example, a compiler of a given programming language may detect this upon seeking to compile outputted code for a library. When either an unexpected output and/or an input requirement is detected, processing logic outputs a notification, including the transformed code for each language in which unexpected output and/or input requirement was detected (processing block 412). Otherwise, processing logic then determines whether there are additional declarative statements with the API written in the declarative statement (processing block 414). When there are additional declarative statements in the API to transform, processing logic returns to processing block 404). Otherwise, the process ends.

In embodiments, the process may be configured to re-generate the API libraries and documentation each time the process is run. In this embodiment, block 408 then builds the API libraries and documentation each time the process 400 is executed by processing logic.

FIG. 5 is one embodiment of a computer system that may be used to support the systems and operations discussed herein. It will be apparent to those of ordinary skill in the art, however that other alternative systems of various system architectures may also be used.

The data processing system illustrated in FIG. 5 includes a bus or other internal communication means 515 for communicating information, and one or more processor(s) 510 coupled to the bus 515 for processing information. The system further comprises a random access memory (RAM) or other volatile storage device 550 (referred to as memory), coupled to bus 515 for storing information and instructions to be executed by processor(s) 510. Main memory 550 also may be used for storing temporary variables or other intermediate information during execution of instructions by processor(s) 510. The system also comprises a read only memory (ROM) and/or static storage device 520 coupled to bus 515 for storing static information and instructions for processor(s) 510, and a data storage device 525 such as a magnetic disk or optical disk and its corresponding disk drive. Data storage device 525 is coupled to bus 515 for storing information and instructions.

The system may further be coupled to a display device 570, such as a light emitting diode (LED) display or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor(s) 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments as discussed herein.

It will be apparent to those of ordinary skill in the art that the system, method, and process described herein can be implemented as software stored in main memory or read only memory and executed by processor. This control logic or software may also be resident on an article of manufacture comprising a non-transitory computer readable medium having computer readable program code embodied therein and being readable by the mass storage device and for causing the processor to operate in accordance with the methods and teachings herein.

The embodiments discussed herein may also be embodied in a handheld or portable device containing a subset of the computer hardware components described above. For example, the handheld device may be a mobile telephone, tablet computer, special purpose computer device, etc. configured to contain only the bus, the processor, and memory. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor, a data storage device, a bus, and memory, and only rudimentary communications mechanisms, such as a small touch-screen that permits the user to communicate in a basic manner with the device. In general, the more special-purpose the device is, the fewer of the elements need be present for the device to function.

Although the present application has been described with reference to the services and/or products of a commerce platform system deployed using the resources of cloud services provider system(s), the embodiments of the present invention are not limited to commerce platform cloud infrastructure spending modeling, analysis, and usage. In embodiments, any company, organization, university, etc. that utilizes resources of a cloud services provider system to deploy, manage, or otherwise support their operations may utilize the systems, methods, and techniques discussed herein.

It will be appreciated by those of ordinary skill in the art that any configuration of the system may be used for various purposes according to the particular implementation. The control logic or software implementing the described embodiments can be stored in main memory, mass storage device, or other storage medium locally or remotely accessible to processor.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A code generation method, comprising:
accessing, by a computer processing system, an application programming interface (API) specification written in a first computer programming language;
processing, by the computer processing system, the API specification in the first computer programming language with a code generation tool; and
generating, by the computer processing system from the API specification, code in each of a plurality of different computer programming languages different from the first computer programming language and different from each other, wherein the first computer programming language is a declarative computer programming language, and each of the plurality of different computer programming languages are not declarative computer programming languages, and wherein the generating further comprises:
  interpreting by the code generation tool, a declarative statement in the first computer programming language in which the API specification is written, and
  outputting, by the code generation tool, a plurality of snippets of code corresponding to the declarative statement, wherein each output snippet of code is expressed in one of the plurality of different computer programming languages, and each output snippet of code is in a compliable or near compliable form for a computer programming language to which the output snippet of code belongs.

2. The method of claim 1, further comprising:
when an output snippet of code is in a near compilable form, generating a notification for a developer comprising the output snippet of code and the status of the code;
receiving an update to the output snippet of code from the developer, the updated output snippet in compilable form; and
replacing the near compilable form of the output snippet of code with the received updated output snippet in compilable form.

3. The method of claim 1 wherein processing the API specification in the first computer programming language with the code generation tool, further comprises:
generating, by the code generation tool, an abstract syntax tree from a plurality of declarative statements in the API specification, the abstract syntax tree modeling source code of the application programming interface (API) specification written in the first computer programming language;
accessing, by one or more printers of the code generation tool, the outputted plurality of snippets of code corresponding to each declarative statement in the API specification; and
transforming, by the one or more printers of the code generation tool, the outputted plurality of snippets of code corresponding to each declarative statement in the API specification into the code in each of a plurality of different computer programming languages different from the first computer programming language.

4. The method of claim 3, further comprising:
embedding the code in each of a plurality of different computer programming languages in a different API client library associated with the programming language to which the API client library applies.

5. The method of claim 1, further comprising:
outputting, by the code generation tool, one of the plurality of snippets of code, commenting associated with the one of the plurality of snippets of code, or a combination thereof to a predefined location within documentation for an API library to which the snipped of code belongs.

6. The method of claim 1, wherein the declarative statement comprises a declarative statement of a function, component, construct, or operation of the API specification written in the first computer programming language.

7. The method of claim 1, wherein the first computer programming language comprises REACT, and the different programming languages comprises two or more of JAVA, JAVASCRIPT, PHP, RUBY, .NET, NODE, and GO.

8. A code generation system comprising:
a memory; and
a processor coupled with the memory to perform operations, comprising:
  accessing, from the memory, an application programming interface (API) specification written in a first computer programming language,
  processing the API specification in the first computer programming language with a code generation tool, and
  generating, from the API specification, code in each of a plurality of different computer programming languages different from the first computer programming language and different from each other, wherein the first computer programming language is a declarative computer programming language, and each of the plurality of different computer programming languages are not declarative computer programming languages, and wherein the generating further comprises:
    interpreting by the code generation tool, a declarative statement in the first computer programming language in which the API specification is written; and
    outputting, by the code generation tool, a plurality of snippets of code corresponding to the declarative statement, wherein each output snippet of code is expressed in one of the plurality of different computer programming languages, and each output snippet of code is in a compliable or near compliable form for a computer programming language to which the output snippet of code belongs.

9. A non-transitory computer readable medium comprising instructions, which when executed by a computer processing system, cause the computer processing system to perform operations for generating code, the operations comprising,
accessing, by the computer processing system, an application programming interface (API) specification written in a first computer programming language;
processing, by the computer processing system, the API specification in the first computer programming language with a code generation tool; and
generating, by the computer processing system from the API specification, code in each of a plurality of different computer programming languages different from the first computer programming language and different from each other, wherein the first computer programming language is a declarative computer programming language, and each of the plurality of different computer programming languages are not declarative computer programming languages, and wherein the generating further comprises:

interpreting by the code generation tool, a declarative statement in the first computer programming language in which the API specification is written; and     outputting, by the code generation tool, a plurality of snippets of code corresponding to the declarative statement, wherein each output snippet of code is expressed in one of the plurality of different computer programming languages, and each output snippet of code is in a compliable or near compliable form for a computer programming language to which the output snippet of code belongs.

10. The non-transitory computer readable medium of claim 9, further comprising:

when an output snippet of code is in a near compilable form, generating a notification for a developer comprising the output snippet of code and the status of the code;

receiving an update to the output snippet of code from the developer, the updated output snippet in compilable form; and     replacing the near compilable form of the output snippet of code with the received updated output snippet in compilable form.

11. The non-transitory computer readable medium of claim 9, wherein processing the API specification in the first computer programming language with the code generation tool, further comprises:

generating, by the code generation tool, an abstract syntax tree from a plurality of declarative statements in the API specification, the abstract syntax tree modeling source code of the application programming interface (API) specification written in the first computer programming language;

accessing, by one or more printers of the code generation tool, the outputted plurality of snippets of code corresponding to each declarative statement in the API specification; and     transforming, by the one or more printers of the code generation tool, the outputted plurality of snippets of code corresponding to each declarative statement in the API specification into the code in each of a plurality of different computer programming languages different from the first computer programming language.

12. The non-transitory computer readable medium of claim 11, further comprising:

embedding the code in each of a plurality of different computer programming languages in a different API client library associated with the programming language to which the API client library applies.

13. The non-transitory computer readable medium of claim 9, further comprising:

outputting, by the code generation tool, one of the plurality of snippets of code, commenting associated with the one of the plurality of snippets of code, or a combination thereof to a predefined location within documentation for an API library to which the snipped of code belongs.

14. The non-transitory computer readable medium of claim 9, wherein the declarative statement comprises a declarative statement of a function, component, construct, or operation of the API specification written in the first computer programming language.

15. The non-transitory computer readable medium of claim 9, wherein the first computer programming language comprises REACT, and the different programming languages comprises two or more of JAVA, JAVASCRIPT, PHP, RUBY, .NET, NODE, and GO.

16. The system of claim 8, wherein the processor is further configured to perform operations, comprising:

when an output snippet of code is in a near compilable form, generating a notification for a developer comprising the output snippet of code and the status of the code;

receiving an update to the output snippet of code from the developer, the updated output snippet in compilable form; and     replacing the near compilable form of the output snippet of code with the received updated output snippet in compilable form.

17. The system of claim 8, wherein the processor processing the API specification in the first computer programming language with the code generation tool, further comprises the processor:

generating, by the code generation tool, an abstract syntax tree from a plurality of declarative statements in the API specification, the abstract syntax tree modeling source code of the application programming interface (API) specification written in the first computer programming language;

accessing, by one or more printers of the code generation tool, the outputted plurality of snippets of code corresponding to each declarative statement in the API specification; and     transforming, by the one or more printers of the code generation tool, the outputted plurality of snippets of code corresponding to each declarative statement in the API specification into the code in each of a plurality of different computer programming languages different from the first computer programming language.

18. The system of claim 17, wherein the processor is further configured to perform operations, comprising:

embedding the code in each of a plurality of different computer programming languages in a different API client library associated with the programming language to which the API client library applies.

19. The system of claim 8, wherein the processor is further configured to perform operations, comprising:

outputting, by the code generation tool, one of the plurality of snippets of code, commenting associated with the one of the plurality of snippets of code, or a combination thereof to a predefined location within documentation for an API library to which the snipped of code belongs.

20. The system of claim 8, wherein the declarative statement comprises a declarative statement of a function, component, construct, or operation of the API specification written in the first computer programming language.

21. The system of claim 8, wherein the first computer programming language comprises REACT, and the different programming languages comprises two or more of JAVA, JAVASCRIPT, PHP, RUBY, .NET, NODE, and GO.

\* \* \* \* \*